(12) United States Patent
Li et al.

(10) Patent No.: US 7,745,051 B2
(45) Date of Patent: Jun. 29, 2010

(54) INSULATED SEPARATOR FOR ELECTRICAL ENERGY STORAGE SYSTEM

(75) Inventors: Yuan-Peng Li, Beijing (CN);
Chang-Hong Liu, Beijing (CN);
Shou-Shan Fan, Beijing (CN)

(73) Assignees: Tsinghua University, Beijing (CN);
Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 174 days.

(21) Appl. No.: 11/947,078

(22) Filed: Nov. 29, 2007

(65) Prior Publication Data
US 2008/0254352 A1    Oct. 16, 2008

(30) Foreign Application Priority Data
Apr. 11, 2007    (CN) .......................... 200710073886

(51) Int. Cl.
*H01M 2/16* (2006.01)
*H01M 10/40* (2006.01)
(52) U.S. Cl. ................... 429/255; 429/249; 429/324
(58) Field of Classification Search ............... 429/122, 429/152, 154, 255, 249, 324; 427/458, 535, 427/536
See application file for complete search history.

(56) References Cited

U.S. PATENT DOCUMENTS

| | | | | | |
|---|---|---|---|---|---|
| 2,096,933 | A | * | 10/1937 | Burgess | 264/49 |
| 2,117,371 | A | * | 5/1938 | Slayter | 429/145 |
| 4,341,847 | A | * | 7/1982 | Sammells | 429/27 |
| 5,567,544 | A | * | 10/1996 | Lyman | 429/152 |
| 6,001,139 | A | * | 12/1999 | Asanuma et al. | 29/623.3 |
| 6,830,782 | B2 | * | 12/2004 | Kanazawa | 427/458 |

OTHER PUBLICATIONS

Davis, Charles T., "The Manufacture of Paper", Philadelphia and London: Henry Carey Baird & Co., p. 57-59, 1886.*
"Oregon Geology", Oregon Department of Geology and Mineral Industries, vol. 52, No. 4, p. 85, Jul. 1990.*
"Colon Hygiene", The University of Michigan, Good Health Publishing Company, p. 233, 1915.*
Li, Yuan, et al., "Warm compacted NbC particulate reinforced iron-base composite", Trans. Nonferrious Met. Soc. China, vol. 12 No. 4, Sum. 49, Abstract, Aug. 2002.*

* cited by examiner

*Primary Examiner*—Jonathan Crepeau
*Assistant Examiner*—Kenneth Douyette
(74) *Attorney, Agent, or Firm*—Jeffrey T. Knapp

(57) ABSTRACT

An electrical storage system includes a first electrode, a second electrode, an insulated separator, and an electrolyte. The second electrode is spaced from the first electrode. The insulated separator is disposed between the first electrode and the second electrode. The separator further includes an agar and a fiber material. The electrolyte surrounds the first electrode and the second electrode.

18 Claims, 4 Drawing Sheets

INSULATED SEPARATOR FOR ELECTRICAL ENERGY STORAGE SYSTEM

RELATED APPLICATIONS

This application is related to commonly-assigned application Ser. No. 11/947,068 entitled, "Membrane and Method for Making the Same", filed Nov. 29, 2007. Disclosure of the above-identified application is incorporated herein by reference.

BACKGROUND

1. Field of the Invention

The invention relates to electrical energy storage systems and, particularly, to an electrical energy storage system used in an electronic product acting as an electrical source.

2. Discussion of Related Art

Electrical energy storage system, such as batteries, includes, inter alia, a cathode, an anode, electrolyte, and an insulated separator. The insulated separator is generally arranged between the anode and the cathode, and separates the anode from the cathode so as to eliminate or reduce the chances of the anode and the cathode short circuiting. In a charge-discharge process of the battery, ions in the electrolyte migrate from the cathode to the anode and vice versa. As such, ions must pass through the insulated separator. Thus, ion migration in the electrolyte is mainly determined by the degree of saturation of the insulated separator with the electrolyte. The degree of saturation of the insulated separator may also affect the internal resistance of the storage systems.

What is needed, therefore, is an electrical energy storage system that includes an insulated separator promoting/having a good saturation with the electrolyte.

SUMMARY

An electrical storage system includes a first electrode, a second electrode, an insulated separator, and an electrolyte. The second electrode is spaced from the first electrode. The insulated separator is disposed between the first electrode and the second electrode. The insulated separator further includes an agar and a fiber material. The electrolyte surrounds the first electrode and the second electrode.

Other advantages and novel features of the present electrical energy storage system will become more apparent from the following detailed description of present embodiments, when taken in conjunction with the accompanying drawings.

BRIEF DESCRIPTION OF THE DRAWINGS

Many aspects of the present electrical energy storage system can be better understood with reference to the following drawings. The components in the drawings are not necessarily to scale, the emphasis instead being placed upon clearly illustrating the principles of the present electrical energy storage system.

Figure 1:
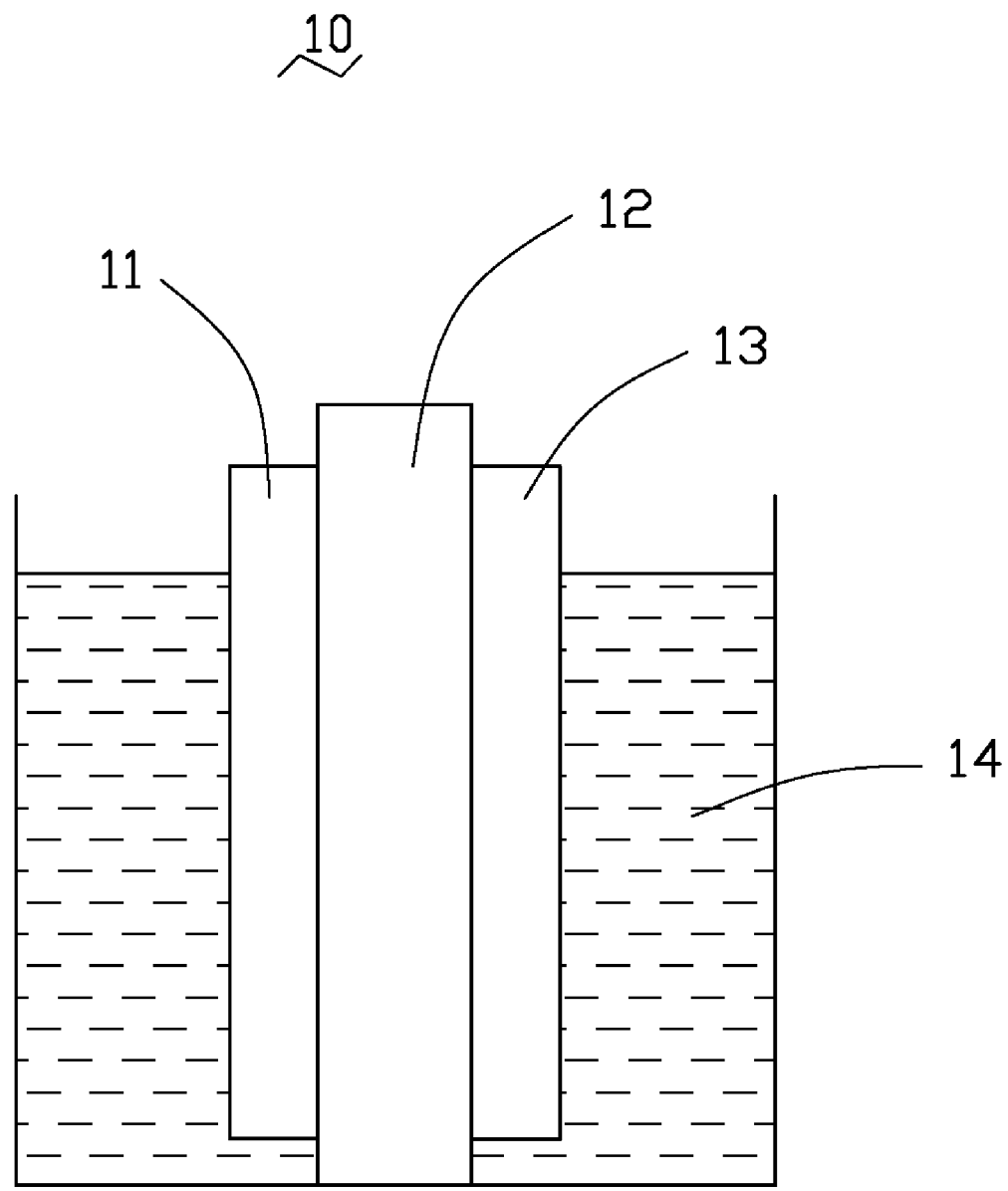
FIG. 1 is a schematic structure diagram of an lithium ion battery, in accordance with a present embodiment.

Corresponding reference characters indicate corresponding parts throughout the several views. The exemplifications set out herein illustrate at least one present embodiment of the electrical energy storage system, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the electrical energy storage system.

Referring to FIG. 1, a present embodiment provides an electrical energy storage system 10, which includes a first electrode 11, a second electrode 13, an insulated separator 12, and an electrolyte 14. The second electrode 13 is spaced apart from the first electrode 11. The insulated separator 12 is disposed between the first electrode 11 and the second electrode 13 to avoid short circuiting the first electrode 11 and the second electrode 13. The separator 12 includes an agar and a fiber material. The electrolyte 14 surrounds the first electrode 11 and the second electrode 13.

There are two positional relationship for arranging the insulated separator 12 with the first electrode 11 and the second electrode 13. The first positional relationship is that the insulated separator 12 is directly connected to the first electrode 11 and may or may not be connected to the second electrode 13. Specifically, the insulated separator 12 is connected to the first electrode 11 and directly connected to the second electrode 13 or connected to the second electrode 13 with conductive adhesive materials. The second positional relationship is that the insulated separator 12 is separated from the first electrode 11 and the second electrode 13.

When the first electrode 11 and the second electrode 13 are made of the same material, the electrical energy storage system 10 is equivalent to a capacitor. Under this condition, the first electrode 11 and the second electrode 13 are made of the same substance selected from a group consisting of carbon materials, metal oxides, and conductive polymers. When the first electrode 11 and the second electrode 13 are made of different materials, the electrical energy storage system 10 is equivalent to a battery. A lithium ion battery will be used as an example to explain the types of different materials that is used for the first electrode 11 and the second electrode 13. In a lithium ion battery, the first electrode 11 is the cathode, and materials used as cathodes includes at least one metal oxide, such as a lithium-cobalt oxide, a lithium-manganese oxide, and a nickel-lithium oxide. The second electrode 13 is the anode, which is generally made from materials including, at least, carbon.

Two types of insulated separators 12 are provided. A first type of insulated separator includes an agar (i.e., a natural polysaccharide polymer material) and a fabric material. The agar is distributed so as to surround the fibers of the fabric material. Agar materials can, for example, be derived from certain algae. A second type of insulated separator includes an agar and a non-woven fiber material. The non-woven fiber material is dispersed in the agar.

The first type of insulated separator is constituted of a fabric of fibers. The fabric of fibers includes at least one of natural fibers and artificial fibers, in the form of, e.g., a gauze fabric, a non-woven fabric, a cotton fabric, and/or a glass fiber film/fabric. In the first type of insulated separator, the agar is formed/deposited on the surface of fibers of the fabric and in the gaps between the fibers.

The second type of insulated separator is constituted of non-woven fibers. The non-woven fibers include at least one substance selected from paper pulp and wood pulp. In the second type of insulated separator, the fiber material is uniformly distributed and bonded with the agar. That is, the non-woven fiber material is dispersed in the agar.

The electrolyte 14 generally includes at least one solvent and solute. It is to be noted that additives can, opportunely, be added into the electrolyte 14. For example, in the lithium ion battery, the solute is generally a lithium metal salt. The solvent is generally an anhydrous organic solvent, such as aether, cyclic ether, polyether, ester, sulfone, carbonate alkyl olefinic ester, organic sulfate ester, borate ester, and nitro compounds, etc.

The additives added into the electrolyte 14 are used to improve the operation of the battery, such as the conductivity, preventing decomposition of the electrolyte, enhancing the safety of the battery, and protecting the battery from overcharging. For example, in the electrolyte 14 of the lithium ion battery 10, some fire retardant materials, such as organic phosphorus, silane, boric acid ester, is added to make that the electrolyte 14 does not overcharge, overheat, or explode during charging of the battery. Some reducing materials, such as carbon dioxide, sulfur dioxide, carbonate ester, are added to react with the anode of battery. Thus, the reducing materials passivate the anode to prevent further decomposition between the electrolyte 14 and the electrodes. Some other substances, such as boron, nitrogen, phosphorus, sulfur oxides, and the corresponding organic compounds, are added to reduce the loss of lithium ion or/and to reduce the internal resistance of the lithium ion battery.

In the present embodiment, the electrical energy storage system 10 is a lithium ion battery. The first electrode 11 is a cathode, which is, beneficially, made of a lithium cobalt oxide. The second electrode 13 is an anode, which is, advantageously, made of a carbon material. The electrolyte 14, opportunely, includes lithium perchlorate ($LiClO_4$) acting as the solute and carbonate ethylene acting as the solvent. In addition, the insulated separator 12, beneficially, includes the agar and the fiber material.

A method for producing/making the present lithium ion battery 10 includes the following steps: (a) providing a first electrode 11, a second electrode 13, and an electrolyte 14; (b) making the insulated separator 12; and (c) assembling the first electrode 11, the second electrode 13, the electrolyte 14, and the insulated separator 12 to form the lithium ion battery 10.

In step (a), the first electrode 11, advantageously, is made of a lithium cobalt oxide, and the second electrode 13, advantageously, is made of one carbon material. The electrolyte 14, advantageously, is formed by lithium perchlorate ($LiClO_4$) and carbonate ethylene.

In step (b), a method for making the foregoing insulated separator 12 includes the following substeps: (b1) mixing an agar with water to form a slurry of agar; (b2) dropping/immersing a fiber material into the slurry of agar to form a pre-composite; and (b3) forming the pre-composite into a composite and solidifying the composite to obtain the insulated separator 12.

Reference will now be made, in detail, to the method for making the insulated separator 12.

In the first present embodiment, the fabric of fibers and the agar are selected as raw materials to make the first type of insulated separator 12.

Step (b1) further includes the substeps of: (b11). mixing the agar with water at room temperature for about 8-10 hours to form an agar-water dispersion system; and (b12). heating and agitating the agar-water dispersion system in a water bath at a temperature of about 80~95° C., for about 2-3 hours to form a slurry of agar.

In step (b11), in the agar-water dispersion system, a quality percentage of the agar is in the approximate range from 1% to 2%. In the process of absorbing water, the agar gradually reaches a soft, swollen, and transparent state by absorbing water in the forming process. When the agar is nearly completely dissolved/dispersed in the water, a transparent slurry of agar is obtained. In step (b12), to avoid the transparent slurry of agar from solidifying and/or the agar separating therefrom, continuous heating at about 80~95° C. in the water bath is maintained, for about 2-3 hours to form a slurry of agar.

The step (b2) further includes the substeps of: (b21) providing at least one fabric of fibers and immersing each fabric into the slurry of agar to form a pre-composite; and (b22) heating and agitating the pre-composite in the water bath at the temperature of about 80~95° C.

Figure 2:
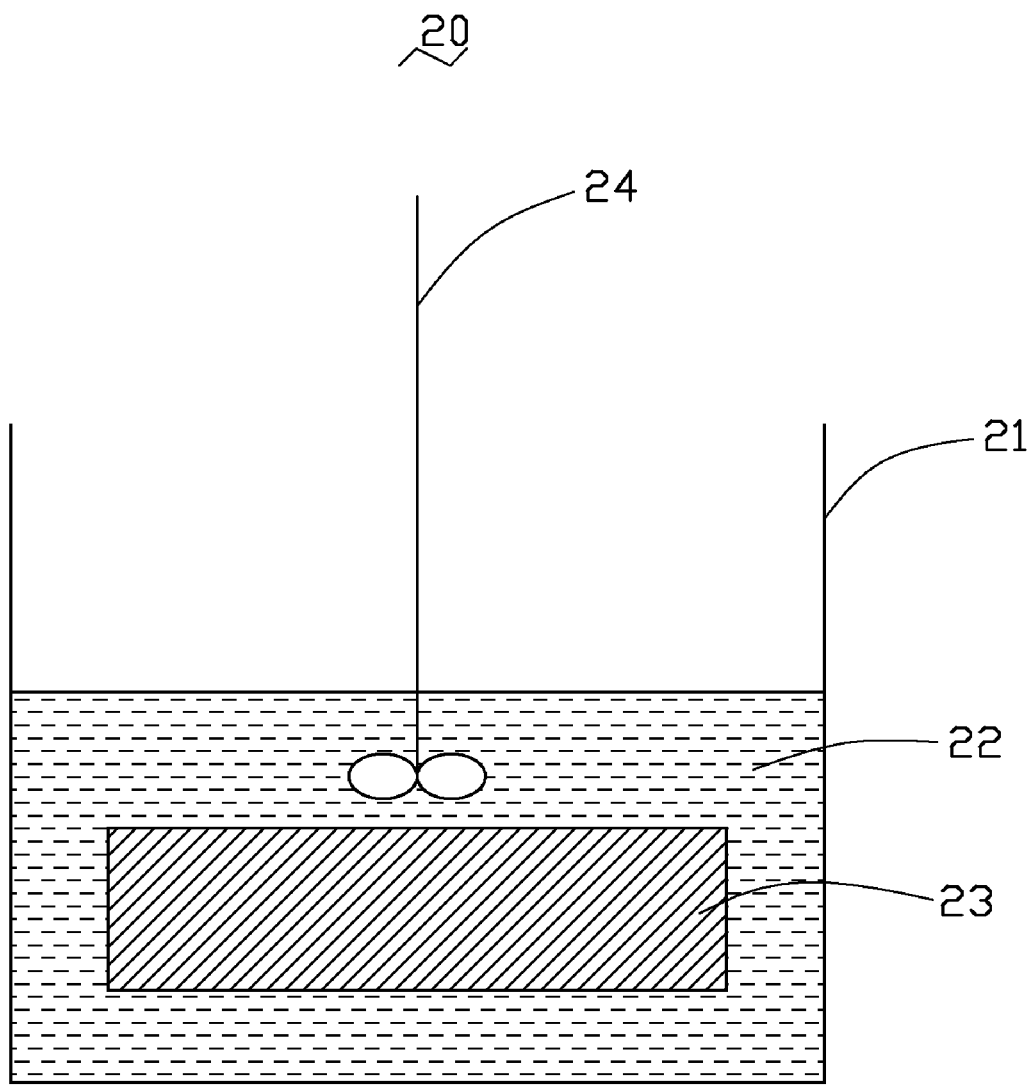
FIG. 2 is a schematic structure diagram of a compounding device to form the slurry of the agar, in accordance with the present embodiment.

Referring to FIG. 2, a compositing device 20 is provided to form a pre-composite containing the slurry of agar 22 and the fabric of fibers 23. The compositing device 20 includes a container 21 and a stirrer 24.

In step (b21), the fabric of fibers 23 (e.g. a gauze fabric) is cut or otherwise formed to a predetermined size/shape. The cut gauze fabric 23 is immersed into the slurry of agar 22 within the container 21 to form a pre-composite. In step (b22), the container 21 with the pre-composite therein is put into the water bath to heat. To avoid the slurry of agar 22 solidifying, the stirrer 24 is used to agitate the mixture for about 2-3 minutes during the process of heating, and during which time a continuous heating of the water bath is also needed. The agitating of the mixture increases the probability of the slurry of agar 22 being deposit on and within the cut gauze fabric 23. That is, the agar 22 from the slurry thereof is thereby able to fully form/deposit on the surface of fibers and in the gaps between the fibers. Furthermore, the agitating process can also remove bubbles in the slurry of agar 22 to make the slurry of agar 22 with the cut gauze fabric 23 bond/attach well therewith, thus transforming from a pre-composite from to a composite form.

Step (b3) further includes the substeps of: (b31) spreading out (i.e., placing) the pre-composite between two spacers; (b32) squeezing/compressing the pre-composite using the two spacers, under a certain pressure, to yield a composite; and (b33) cooling and solidifying the composite and removing the two spacers to obtain the first type of insulated separator.

Figure 3:
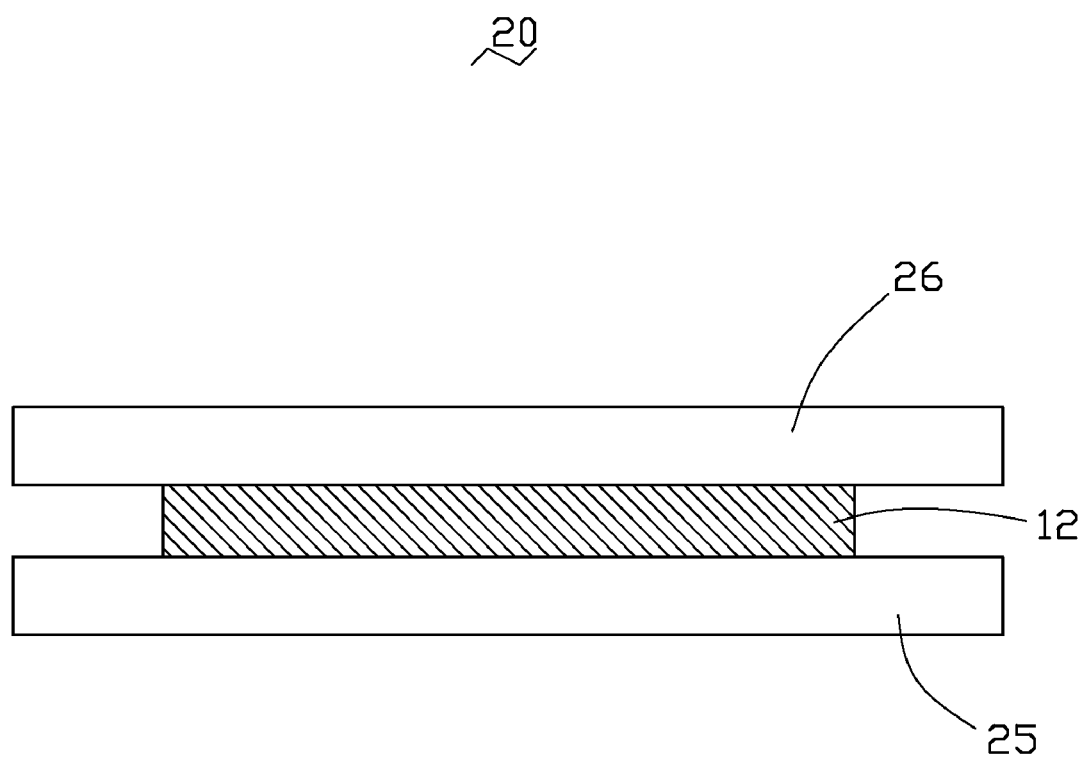
FIG. 3 is a schematic structure diagram of a squeezing/compression device to squeeze/compress a pre-composite to obtain the insulated separator, in accordance with the present embodiment.

Referring to FIG. 3, a squeezing/compressing device 30 is provided to squeeze/compress the pre-composite to form the first type of insulated separator. The squeezing device 30 includes a first spacer 25 and a second spacer 26.

In step (b31), the pre-composite is taken out from the container 21 and smoothly spread out on the surface between two spacers. Specifically, the pre-composite is put on the surface of a first spacer 25, and then a second spacer 26 is put on the surface of the pre-composite. In step (b32), the pressure is about 2000 Pa. In step (b33), the squeezed composite is cooled at room temperature for about 5-6 minutes. In the cooling process, the agar 22 slowly solidifies, and gradually reaches a fully solidified state. After the agar attains a fully solidified state, the first spacer 25 and the second spacer 26 can be removed. Thus, the first type of insulated separator 12 is obtained.

The first spacer 25 and the second spacer 26 can, opportunely, be chosen to have a predetermined surface structure.

When a smooth insulated separator 12 is needed, for example, two flat substrates are selected to act as the first spacer 25 and the second spacer 26 respectively.

A thickness of the insulated separator 12 obtained in the present embodiment can, opportunely, be controlled according to the need. For example, a fabric of fibers with an appropriate thickness can, beneficially, be chosen to make the insulated separator 12. Moreover, at least two layers of fabric can overlap and be immersed into the slurry of agar to form a predetermined thickness of the insulated separator 12. As such, the formed insulated separator 12 can have two or more fabric layers.

The second embodiment is similar to the first embodiment, except for the fiber material employed. In the second embodiment, a non-woven fiber material is selected as the fiber material to form the second type of insulated separator 12. The production process is described in detail.

In step (b1), a slurry of agar is prepared as per in the first embodiment, or the prepared slurry of agar of the first embodiment is employed. In step (b2), a non-woven fiber, (e.g., paper pulp) is mixed with the slurry of agar and is then heated and agitated in the water bath at the temperature of about 80~95° C. In step (b3), after the pulp is uniformly mixed with the slurry of agar, the mixture of the pulp and the agar is injected into a molding die (not shown) to form the insulated separator 12 having a needed structure and size.

The structure and size of the cavity in the molding die can, opportunely, be designed according to the structure and size of the formed insulated separator 12. The pre-composite is, advantageously, rapidly injected into the molding die, so as to avoid the agar in the pre-composite solidifying before the formation of the desired composite is complete.

In step (c), the insulated separator 12 has a first surface and a second surface opposite to the first surface. The first electrode 11 and the second electrode 13 are connected/attached to the first surface and the second surface respectively. Thereby, the first electrode 11, the second electrode 13, and the insulated separator 12 formed an integral structure. A part of the integral structure is immersed into the electrolyte 14, thus the lithium ion battery 10 is formed. It is to be understood that the electrolyte 14 is generally put into a container or a shell in practical applications. A part of the integral structure is immersed into the electrolyte 14, and is fixed with the container or the shell. Thus, after packaging, the lithium ion battery 10 is formed.

Figure 4:
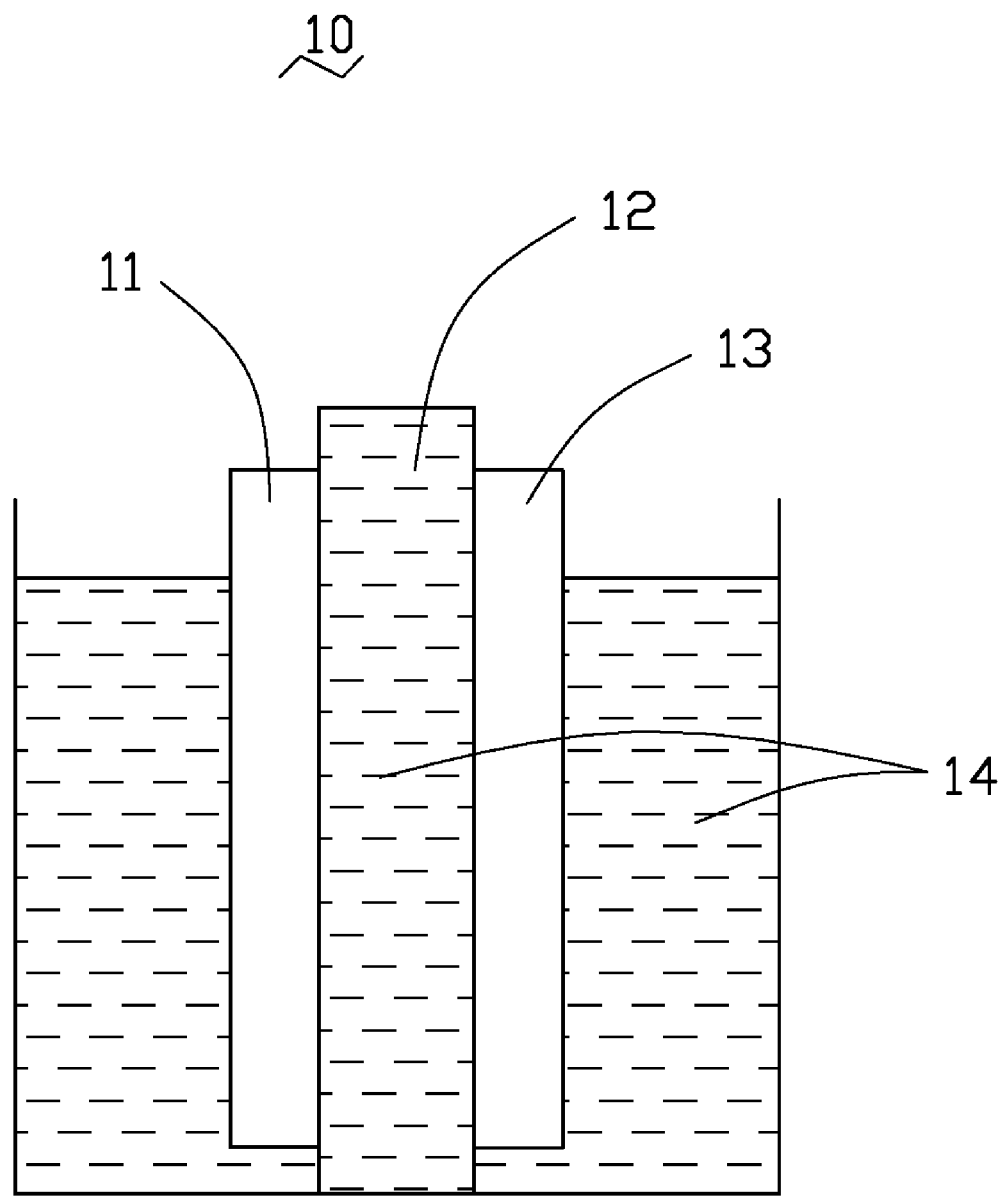
FIG. 4 is a schematic diagram of the insulated separator in the working process of the present lithium ion battery.

The lithium ion battery 10 is widely used as a power source in consumer electronics products. Referring to FIG. 4, in the work process of the lithium ion battery 10, due to the agar having an excellent hygroscopic property, after putting the insulated separator 12 into the electrolyte 14, the agar in the insulated separator 12 and the electrolyte 14 dispersed in insulated separator 12 can, opportunely, form a gelatinous substance. On the one hand, the gelatinous substance existing in the insulated separator 12 promotes a good saturation between the insulated separator 12 and the electrolyte 14. The good saturation is beneficial to conduct ions in the process of charging and discharging. As such, ion penetrability within the insulated separator 12 is increased, and, thus, the internal resistance of the battery is reduced. On the other hand, the gelatinous substance existed in the insulated separator 12 can make the insulated separator 12 and the electrodes bond well together. As such, collecting electron effects of the first electrode 11 and the second electrode 13 is increased.

Furthermore, the insulated separator 12 in the present lithium ion battery 10 has a good mechanical strength and tensile strength. In the assembly process of the battery 10, the present lithium ion battery 10 can prevent the insulated separator 12 from a potential rupture, rupturing of the insulated separator 12 could make the battery 10 susceptible to short circuiting. The insulated separator 12, in manufactured product (e.g. a battery), should have a certain minimum amount of mechanical strength and tensile strength. The fibers in the insulated separator 12 act as a skeleton/support structure. Thus, the insulated separator 12 has good mechanical properties. As such, the battery 10 manufactured by the present method also has good mechanical properties.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An electrical storage system comprising:
a first electrode;
a second electrode being spaced from the first electrode;
an insulated separator disposed between the first electrode and the second electrode;
the separator further comprising a fiber material and agar; the fiber material is uniformly distributed within the agar; and
an electrolyte surrounding the first electrode and the second electrode.

2. The electrical storage system as claimed in claim 1, wherein the first electrode is attached to a first surface of the insulated separator, and the second electrode is attached to a second surface opposite to the first surface.

3. The electrical storage system as claimed in claim 2, wherein the first electrode and the second electrode are attached to the surfaces of the insulated separator by a conductive adhesive material.

4. The electrical storage system as claimed in claim 1, wherein the first electrode and the second electrode are made of a same material.

5. The electrical storage system as claimed in claim 4, wherein the materials of the first electrode and the second electrode are selected from the group consisting of carbon materials, metal oxides, and conductive polymers.

6. The electrical storage system as claimed in claim 1, wherein the insulated separator is separated from the first electrode and the second electrode.

7. The electrical storage system as claimed in claim 1, wherein the electrical storage system is a lithium ion battery, the first electrode is the cathode, and the second electrode is the anode.

8. The electrical storage system as claimed in claim 7, wherein the materials of the cathode are selected from the group consisting of lithium-cobalt oxide, lithium-manganese oxide, and nickel-lithium oxide.

9. The electrical storage system as claimed in claim 7, wherein the material of the anode is carbon.

10. The electrical storage system as claimed in claim 1, wherein the electrolyte comprises at least one solvent and one solute.

11. The electrical storage system as claimed in claim 10, wherein the solute is lithium metal salt.

12. The electrical storage system as claimed in claim 10, wherein the solvent is anhydrous organic solvent.

13. The electrical storage system as claimed in claim 12, wherein the anhydrous organic solvent is selected from the group consisting of aether, cyclic ether, polyether, ester, sulfone, carbonate alkyl olefinic ester, organic sulfate ester, borate ester, and nitro compounds.

14. The electrical storage system as claimed in claim 10, wherein the electrolyte further comprises additives.

15. The electrical storage system as claimed in claim 14, wherein the additives are fire retardant materials selected from the group consisting of organic phosphorus, silane, and boric acid ester.

16. The electrical storage system as claimed in claim 14, wherein the additives are reducing materials selected from the group consisting of carbon dioxide, sulfur dioxide, and carbonate ester.

17. The electrical storage system as claimed in claim 14, wherein the additives are selected from the group consisting of boron, nitrogen, phosphorus, sulfur oxides, and the corresponding organic compounds.

18. An electrical storage system comprising:
a first electrode;
a second electrode being spaced from the first electrode;
an insulated separator disposed between the first electrode and the second electrode, the separator further comprising a fiber material and agar;
the fiber material is comprised of at least one of paper pulp and wood pulp;
the fiber material is uniformly distributed within the agar; and
an electrolyte surrounding the first electrode and the second electrode.

* * * * *